Aug. 17, 1937.   L. A. JOHNSON   2,089,963
FLUID SEAL
Filed Feb. 15, 1934   2 Sheets-Sheet 1
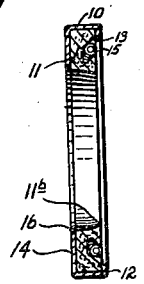
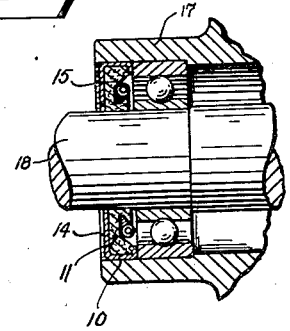
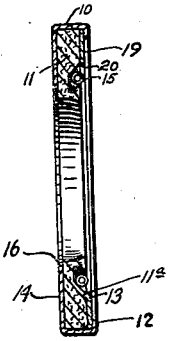
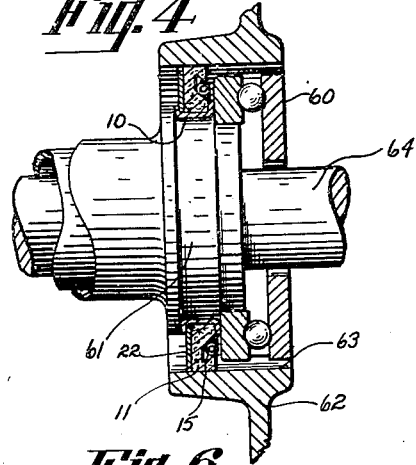
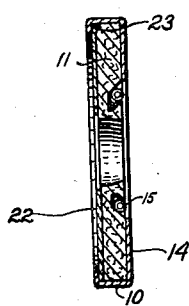
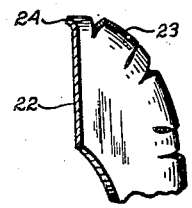
INVENTOR.
LLOYD A. JOHNSON
BY
ATTORNEY.

Aug. 17, 1937.  L. A. JOHNSON  2,089,963
FLUID SEAL
Filed Feb. 15, 1934  2 Sheets-Sheet 2

INVENTOR.
LLOYD A. JOHNSON
BY
ATTORNEY.

Patented Aug. 17, 1937

2,089,963

UNITED STATES PATENT OFFICE 2,089,963

FLUID SEAL

Lloyd A. Johnson, San Francisco, Calif.

Application February 15, 1934, Serial No. 711,421

2 Claims. (Cl. 288—1)

My invention relates to improvements in unitary fluid sealing structures.

An important object of the invention is to provide a self-contained, compact, fluid sealing unit with interlocked parts.

A further object of the invention is to provide a fluid sealing unit in which the leather or soft portion, which contacts the element being sealed, has its grain running transverse to and not parallel with said element; to provide a fluid sealing unit in which the shaft opening can be punched out to an accurate and uniform shaft size after assembly into the cage portion; to provide a fluid sealing unit which can resist great axial pressures tending to push the leather through the opening; to provide a fluid sealing unit with a novel form of flat, pliable washer in which the sealing rim and only a small portion of the washer lying near it is urged into contact with the shaft; and to provide an effective fluid sealing unit which exerts a minimum of braking effect on the shaft.

A further object of the invention is to provide a liquid or fluid sealing unit in which the spring is securely held in place by the sealing element without the aid of a metal cap or enclosure means; and to provide a fluid sealing unit in which the spring gives to the sealing rim its sealing tension by a certain wedging effect.

Other objects and advantages of the invention will be apparent during the course of the following description.

Figure 7:
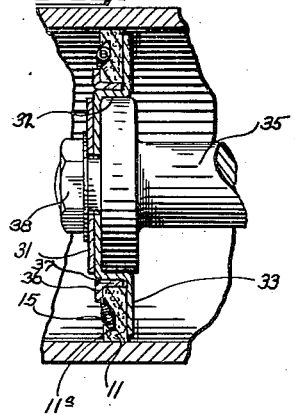
Figure 8:
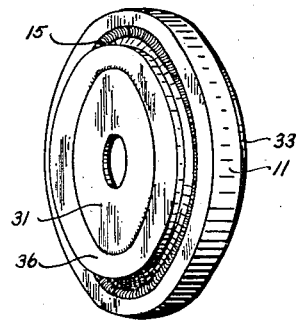
Figure 9:
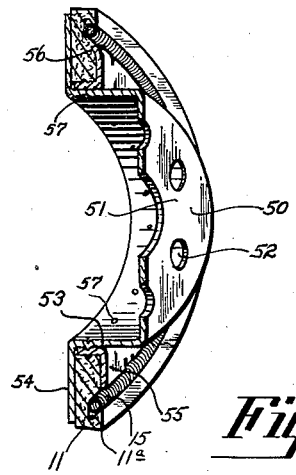
Figure 10:
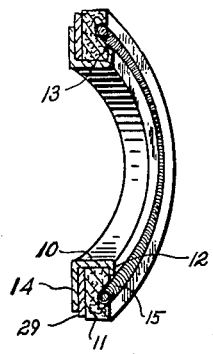
Figure 11:
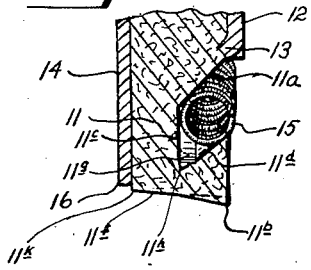

In the accompanying drawings, forming a part of this specification, and in which like numerals are employed to designate like parts throughout the same, Fig. 1 is a perspective cross-section view of a fluid sealing unit embodying my invention, Fig. 2 is a cross-section view through the center of the fluid sealing unit and showing this unit in its cooperative relationship with tubular housing and shaft, Fig. 3 is a perspective cross-section view of a modification of my invention, Fig. 4 is a cross-section view of another modification of my invention, Fig. 5 is a perspective cross-section view of still another modification of my invention, Fig. 6 is a perspective sectional view of the inter-lock washer used in the structures of Figs. 3, 4, 5 and 10 of my invention, Fig. 7 is a cross-section view of a modification of my invention, Fig. 8 is a perspective view of the piston sealing unit of Fig. 7, Fig. 9 is a perspective sectional view of still another modification of my invention, Fig. 10 is a perspective cross-section of another modification of my invention, and Fig. 11 is an enlarged cross-section view of a portion of the device.

The unitary fluid sealing device of my invention shown in Figs. 1 and 2 comprises a casing or housing 10, made of sheet metal or other ductile material adapting it to be press-fitted into a housing or other tubular structure 17, to form therewith a leakproof joint and also to seal the shaft 18 against leakage. It is the usual practice to make the outer diameter of the housing 10 a few thousandths larger than the inside diameter of the housing 17 into which it fits. The diameters of the two last mentioned pieces, however, may be the same yet a tight fit is secured for the reason that the press-fitting of the unit into the housing 17, will effect an expansion of the outside diameter of the cage member 10.

The cage member 10 is adapted to hold within it the leather, or similar fabric, sealing member 11. This sealing or washer member 11 is made of leather, or any other similar material pliable enough to shape itself under the influence of the spring 15. The member 11 must be thick enough to permit the cutting or forming in its front side of an inclined groove 11a (see Fig. 11) for the spring 15, and also leave sufficient body to the washer to support the depending portion. The sharp rim 11b on the depending portion of the member 11 effects the sealing.

The inclined surface 11c and the groove bottom 11d provide a V shaped groove. The spring 15 acts between the walls 11c and 11d of the V groove to contact the rim 11b without materially contracting the ungrooved portion of the washer 11f. Stated in another way, the spring 15, acting in the V slot, swings the depending portion inwardly on a center lying near the base of the slot. The effect on the inside sealing surface of the washer is shown in Fig. 11 by the full line, whereas the dotted lines indicate the position of this surface and the depending portion before the spring 15 is in place and acts in the slot. It is not essential that the converging walls 11d and 11c continue thus, beyond the point where the spring can possibly reach; that is, the bottom of the slot may terminate at 11g (dotted line) instead of at the end point 11h.

The leather or washer 11 preferably is made from a flat piece of leather in which the grain runs in the radial plane, that is, in a plane transverse to the axis of the part to be sealed. The importance of this feature will be realized as the description of my invention progresses.

The outside diameter of the washer member 11 is about the same as the inside diameter of the cage 10, so as to provide a snug fit between these parts. In addition the rim 12, of the cup member 10, is spun over on the washer member 11, to secure it in place. Either before or after the rim 12 is spun over, several spurs 13 are punched out of the rim. These interlock with, or bury themselves in, the body of the washer 11, and provide a secure locking of the washer 11 to prevent rotation in the cage 10.

The bottom of the cup 14 provides the necessary backing or support for the washer 11, to enable it to withstand pressures put upon it by the medium being sealed. The central aperture 16 in the bottom of the cage 10 is usually made to barely clear the shaft, in order to give the maximum support to the washer 11. Since the washer member is flat, the cage can support it practically to where it contacts the shaft itself, hence there is no likelihood of the depending portion or rim 11b of the washer being forced through any opening, as happens today with flange leather type seals when used in structures sealing against high pressures.

The sealing surface 11f (see Fig. 11), on the washer 11 is usually cut after it is assembled in the cage 10. Since this can be done with a punch, or spinning knife, it is possible to have the size very accurate with relation to the movable part it is to seal. The size is usually figured so the non-sealing edge 11k is not in contact with the movable part being sealed.

When used with fractional horsepower motors another feature of the invention becomes important, namely, that with the washer opening 11f and 11k accurately determinable and with the spring 15 urging but a small portion of the washer surface, near 11b, against the shaft 18, a minimum braking effect results therefrom. With formed, flange-type leathers, such as are used today, the heavy braking effect has prevented the use of these spring tightened fluid sealing devices on low powered mechanisms.

From an examination of Figs. 1 and 2, it will be seen that the structure is capable of being made with a very small axial dimension, thus making it possible to use this improved device in small spaces; spaces which have heretofore been sealed only by means which could not employ a spring for tightening the sealing unit about the shaft. Since the structure can be used in very narrow spaces it adapts itself for use in devices with small shaft housings.

In installations where it is not essential to have compactness in the seal in its radial dimension, as is shown in Fig. 3, the seal is made with a metal washer 19, placed on top of the sealing washer 11, before the rim 12 of the cage 10 is spun over to anchor the member 11 in the cage. The metal washer 19 has spurs 20 which are pressed into the body of the sealing member 11. These prevent the member 11 from rotating with relation to the metal washer 19. The latter in turn is anchored to the rim 12 by means of spurs 13, punched out of the rim 12. It is preferable for the front face of the washer 11 to be supported down to the edge of the groove 11a.

The liquid sealing structure shown in Fig. 5 differs from Fig. 3 mainly in details of assembly. In Fig. 5 the grooved side of the washer 11 is placed against the bottom 14 of the cage 10. The metal washer 22 provides the main support in back of the sealing washer 11. The rim is spun over to securely compress the metal washer 22 into the sealing member 11. In doing so, it buries the spurs 23 into the washer 11, and causes undulations in the rim 12. The cage 10, washers 11 and 22 thus become interlocked.

A portion of the washer 22 is shown in perspective in Fig. 6. The spurs 23 are bent out of the plane of the metal washer 22 to a greater degree than the spurs 24. The spurs 23 bury themselves in the back of the sealing member 11, whereas the spurs 24 are in a metal to metal contact with the spun over rim 12 of the cage 10. Sufficient of the rim 12 is pressed down between these spurs 24 to securely anchor the metal washer 22 against rotation, should the sealing member 11 shrink for any reason, such as, climatic changes.

The same principles of sealing, heretofore explained in connection with shaft or rod sealing apply in the sealing of cylinders or internal surfaces. Fig. 11 is common to both, and Figs. 4, 7, 8, 9 and 10 illustrate the structural changes when sealing internal surfaces. In Figs. 1, 2, 3 and 5 the spring 15 is a contracting type, whereas in Figs. 4, 7, 8, 9 and 10 the spring 15 is an expanding type. In Fig. 11 the spring may be either. The groove 11a slopes toward the surface being sealed.

In Fig. 10 the cage 10 has its bottom flange 14 pointing outwardly. This particular sealing structure takes a considerable end thrust and the cage bottom 14 is strengthened by the washer 29. Washer 29 also supports the sealing washer 11 practically to its outer edge. The parts 29 and 11 are held in the cage 10, by spinning over the rim 12, and are held against rotation by spurs 13 in said rim.

In Fig. 4, a structure like Fig. 10 is shown installed with a clutch shifting thrust bearing 60. The sealing structure cage 10 is fitted around the movable collar 61 in a leak-proof joint. The shaft 64 passes through an opening 63 in the oil-filled engine crank case 62. To retain oil in the case it is necessary to seal the opening 63 and this is accomplished by the sealing member 11 and its parts already fully described (see Fig. 11).

Figs. 7 and 8 illustrate an assembled, unitary piston head structure adapted for simplification in the manufacture and assembly of pumping devices. It comprises the sealing member 11, with its groove 11a, and spring 15, assembled in a sheet metal piston head 31. The latter is shaped to provide a cylindrical wall 32 and a radial wall 33. It also has an opening thru which the piston rod 35 extends and to which it is secured by the nut 36. The sealing member 11 is held on the wall 33, in fluid tight engagement, by the cup member 36, 37. The cylindrical wall 37 of this cup member is made of smaller diameter than the wall 32, so as to necessitate the use of a press in assembling these parts. Also the wall 37 terminates short of the bottom to insure a firm compressing of the sealing member between the walls 33 and 36.

Fig. 9 is another type of bolted-on structure, in this instance shown for outside sealing. It comprises the cage member 50, with a flat portion 51 having a series of openings 52, by which it is bolted in place; and a cylindrical portion 53, and a ledge portion 54. Sealed on the ledge portion 54 is the sealing unit 11. This unit is secured in fluid tight engagement with the ledge 54 by means of an L shape cup member 55. The cup 55 also is forced into fluid tight engagement with the cylindrical wall 53 of the cage member 50. The portion 54 of the cup member is in firm engagement with the sealing member, and has spurs 56, which embed themselves in the sealing unit to prevent it from rotating. This cup member 55, in turn, is secured against rotation in the cage member 51 by means of dimples 57 spaced around the cylindrical portion 53 of the cage member.

It is to be understood that the forms of my invention, herewith shown and described, are to be taken as preferred examples of the same, and that various changes in the shape, size and arrangement of parts may be resorted to, without departing from the spirit of my invention, or the scope of the subjoined claims.

What I claim is:

1. A fluid sealing member for use in sealing a movable cylindrical body comprising a thick body portion which in cross section is longer in its radial dimension than in its axial dimension, said body portion having a flexible depending sealing lip formed by cutting a slot in one radial face, the angle of the slot wall forming the top of said lip being less than a right angle to the moveable body being sealed, the radial wall forming the bottom of the slot being at substantially a right angle to the surface being sealed, and the slot wall forming the top of said slot being substantially parallel with the top of said lip, and a coil spring in said slot, the diameter of its coils being substantially equal to the width of said slot whereby said spring cannot seat itself in the bottom of the acute angled crevice formed at the junction of the radial bottom wall of said slot and the wall forming the top of said lip.

2. A fluid sealing member for use in sealing a movable cylindrical body comprising a thick body portion which in cross section is longer in its radial dimension than in its axial dimension, said body portion having a flexible depending sealing lip formed by cutting a slot in one radial face, the angle of the slot wall forming the top of said lip being less than a right angle to the moveable body being sealed, the radial wall forming the bottom of the slot being at substantially a right angle to the surface being sealed, and a coil spring in said slot, the diameter of its coils being greater than said slot at its narrowest point, whereby said spring cannot seat itself in the bottom of the acute angled crevice formed at the junction of the radial bottom wall of said slot and the wall forming the top of said lip.

LLOYD A. JOHNSON.